US008532280B2

(12) United States Patent
Ross et al.

(10) Patent No.: US 8,532,280 B2
(45) Date of Patent: Sep. 10, 2013

(54) NETWORK VALUE DETERMINATION FOR CALL CENTER COMMUNICATIONS

(75) Inventors: Erik Stephen Ross, Charlotte, NC (US); Katherine Ann Krumme, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 13/218,066

(22) Filed: Aug. 25, 2011

(65) Prior Publication Data

US 2013/0051544 A1  Feb. 28, 2013

(51) Int. Cl.
*H04M 3/00* (2006.01)

(52) U.S. Cl.
USPC .................. 379/265.02; 379/265.11; 705/304

(58) Field of Classification Search
USPC .................. 379/265.02, 265.11; 705/304
See application file for complete search history.

(56) References Cited

U.S. PATENT DOCUMENTS

| | | | |
|---|---|---|---|
| 6,263,066 B1 * | 7/2001 | Shtivelman et al. | 379/266.06 |
| 6,349,290 B1 * | 2/2002 | Horowitz et al. | 705/35 |
| 6,819,759 B1 * | 11/2004 | Khuc et al. | 379/309 |
| 6,829,348 B1 * | 12/2004 | Schroeder et al. | 379/265.09 |
| 2005/0131897 A1 * | 6/2005 | Grasso et al. | 707/6 |
| 2010/0027778 A1 * | 2/2010 | Kumar et al. | 379/265.09 |
| 2010/0100412 A1 * | 4/2010 | Cases et al. | 705/9 |
| 2011/0112957 A1 * | 5/2011 | Ingram et al. | 705/38 |
| 2012/0005106 A1 * | 1/2012 | Famous | 705/304 |
| 2013/0117188 A1 * | 5/2013 | Baker, III | 705/304 |

* cited by examiner

*Primary Examiner* — Rasha Al Aubaidi
*Assistant Examiner* — Jirapon Intavong
(74) *Attorney, Agent, or Firm* — Michael A. Springs; Moore and Van Allen, PLLC; Nicholas C. Russell

(57) ABSTRACT

Embodiments of the invention are directed to a call center system providing network metrics based off of an individual's social networking connections, and more particularly embodiments of the invention are directed to methods, apparatuses, and computer program products for providing a recommendation to an individual contacting the call center, based on the reason the customer is contacting the call center and the customer's network metrics. The network metrics include analyzing an individual's social networks and the social network of connections associated with the customer. In this way, recommendations, such as a promotion, product, service, or response to the communication to the call center may be tailored to network metrics of an individual from social networks.

36 Claims, 6 Drawing Sheets

NETWORK VALUE DETERMINATION FOR CALL CENTER COMMUNICATIONS

BACKGROUND

Customers trying to obtain expertise regarding products or services that they wish to purchase, have previously purchased, or have used often contact a manufacturer or merchant customer service representative by visiting a location convenient to them, visiting the location where the customer obtained the product or service, or calling customer service representatives over the telephone.

Call centers are often set up in a supporting role so that customers can speak anytime over the phone to a customer representative that is may be able to meet customers' specific needs or questions.

In a traditional call center, customer service representatives answer calls in the order in which they are received. Once the customer call is placed in a queue for answering, a representative answers the call. The representative may treat one customer differently from another depending on the situation surrounding the customer's call to the call center. The representative may be provided very little information related to the reason as the customer is contacting the call center.

To this end, there is always a demand for a call center to provide satisfying service to all customers that contact the call center.

BRIEF SUMMARY

Embodiments of the present invention address the above needs and/or achieve other advantages by providing apparatuses (e.g., a system, computer program product, and/or other devices) and methods for a call center to provide recommendations to its customer service representative to use with customer where such recommendations are based on network metrics from social networks in which the customer is a member. Use of the apparatuses or methods allows a customer service representative to provide a customer with satisfactory customer service and potentially provide the customer with additional services or promotions of which the customer may not be aware, but which may be beneficial to the customer. For example, if a customer is calling in regard to a credit card statement the customer service representative may provide a solution to the customer's issue with that credit card statement. Further, however, the customer service representative may know from the customer's network metrics that the customer qualifies for a credit card program that will be more beneficial to the customer (i.e., a card with lower interest, better rewards, etc.). Therefore, the customer service representative can offer the customer the new credit card and explain to the customer the benefits of the new card. Without knowledge of the network metrics the customer service representative may not have the information needed to offer the beneficial new credit card to the customer. The network metrics aid the customer service representative in providing satisfactory customer service and provide the customer with services or offers that may further benefit the customer. Increased customer service provided by the present invention results in a more positive call center experience for the customer.

In some embodiments, the call center system may analyze network metrics from a customer. In this way, the customer service representative may provide the customer recommendations based on the network metrics and the issue that has prompted the customer to call. In some embodiments, the recommendations based on the network metrics may provide a customer service representative with a determination to proactively call a customer. In this way, if the network metrics determine that the customer may be unsatisfied with the product, the customer service representative may pre-empt the call from the customer by contacting the customer first. Thus, the call center system may provide proactive outbound calling. Prior to the customer call being routed to a customer service representative, the customer service representative may be provided an indication of the customer issue, network metrics of the customer, and a recommendation for the customer service representative to give to the customer. This recommendation may be in many forms. Recommendations may relate to the product or service about which the customer is calling, similar products or services, non-related products or services, or regarding other recommendations.

Embodiments of the invention allow a call center to not only provide customer service for a customer calling the call center, but also provide recommended products or services based on an analysis of customer network metrics. A customer's network metrics provide an indication of current and future behavior of the customer. The behavior may primarily be financial behavior or behaviors that lead to predictable financial decisions. These behaviors are predicted based on an analysis of network metrics with respect to the customer's social networking. The network metrics can be utilized to build a value based on risk, network position, and deepening value. Analyzing this data, using network science algorithms, the network metrics and the value therefrom, the call center system may be able to determine current or future behavior of the customer. Network metrics may include risk metrics, network position metrics, and deepening value metrics.

When a communication is received from a customer at a call center, the customer may provide the issue as to why he/she is contacting the call center. The customer issue, or the reason the customer is contacting the call center, may be related to a product, service, financial issues, or other customer services that the call center may provide. Once the customer issue is determined and the customer network metrics are analyzed and a network value for the customer is determined, the customer call may be placed in a queue for the customer service representative to answer the customer's call. The customer service representative may then receive an indication of the customer issue, the customer metrics, the customer network value, and a recommendation for the customer service representative to provide to the customer based on the issue and/or customer metrics. The customer service representative may then accept the customer's call.

The network value determination system allows a call center to provide recommendations to a customer based on an analysis of the network metrics of the customer. This allows a customer service representative to provide a customer with satisfactory customer service and potentially provide the customer with additional services or offers that may significantly benefit the customer and thereby increase the customer experience.

In some embodiments a communication from a customer may not need to be received. In this way, the system may preemptively contact customers that the network metrics determine may be unsatisfied with the product the customer purchased.

More particularly, embodiments of the present invention are directed to a method, system, and computer program product for receiving an incoming customer communication; determining a reason for the customer communication; retrieving data from a social network, wherein the data comprises at least in part, information regarding the customer's influence among connections within the social network;

determining a recommended action for the customer communication, based at least in part on the data from the social network; providing an indication of the reason for the customer communications and an indication of the recommended action to the customer service station; and routing the incoming customer communication to the customer service station associated with a customer representative, wherein the recommended action is provided to the customer from the customer representative.

In some embodiments, the data retrieved from the social network comprises information regarding the customer's financial behavior. The data from the social network further provides a network value for the customer. The network value is built based on the customer's position within the social network and the connections the customer has within the social network.

In some embodiments, the recommended action is a promotional offer based on the customer communications or the data from the social network. The customer communications, at least in part, also provides a determination as to the reason for the customer communication. The recommended action may also be a response based on the customer communication or a response based on the data from the social network.

In some embodiments, the customer representative is an individual. In other embodiments, the customer representative is an automated voice system. Either way, an indication of the reason for the customer communications and an indication of the recommended action are provided to the customer representative via an interface.

BRIEF DESCRIPTION OF THE DRAWINGS

Figure 1:
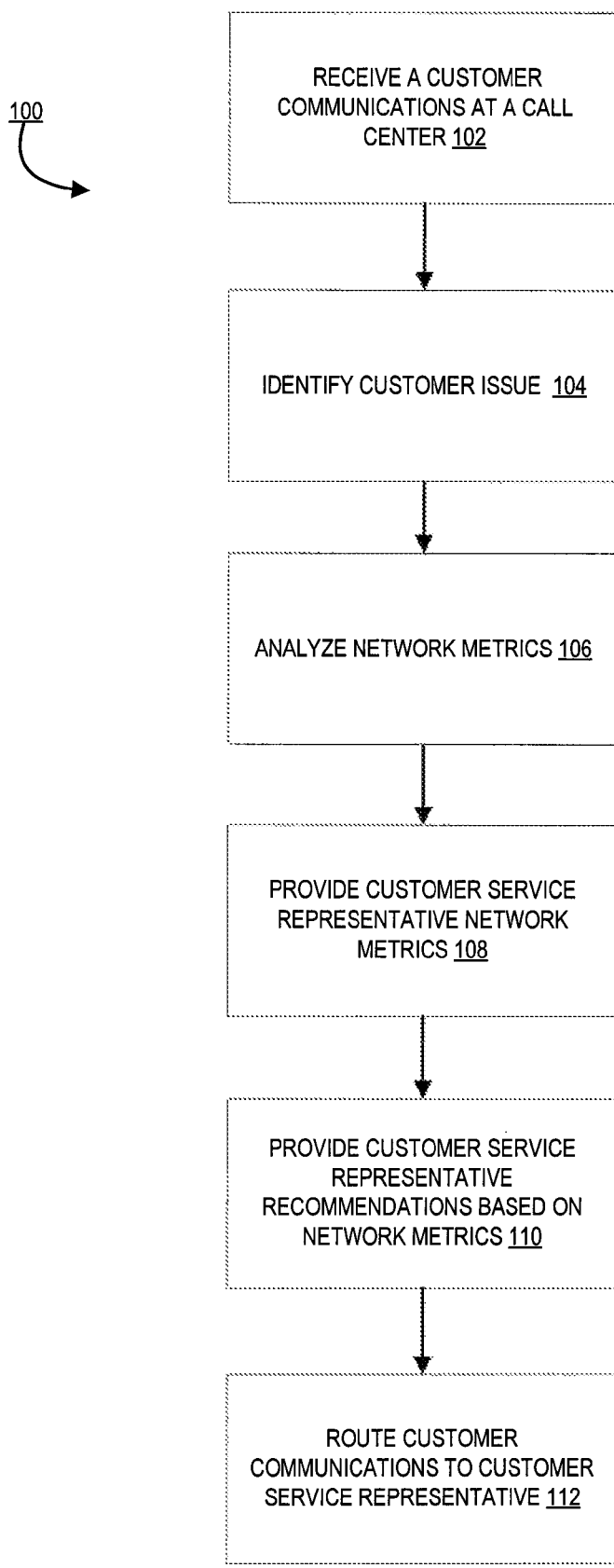
Figure 2:
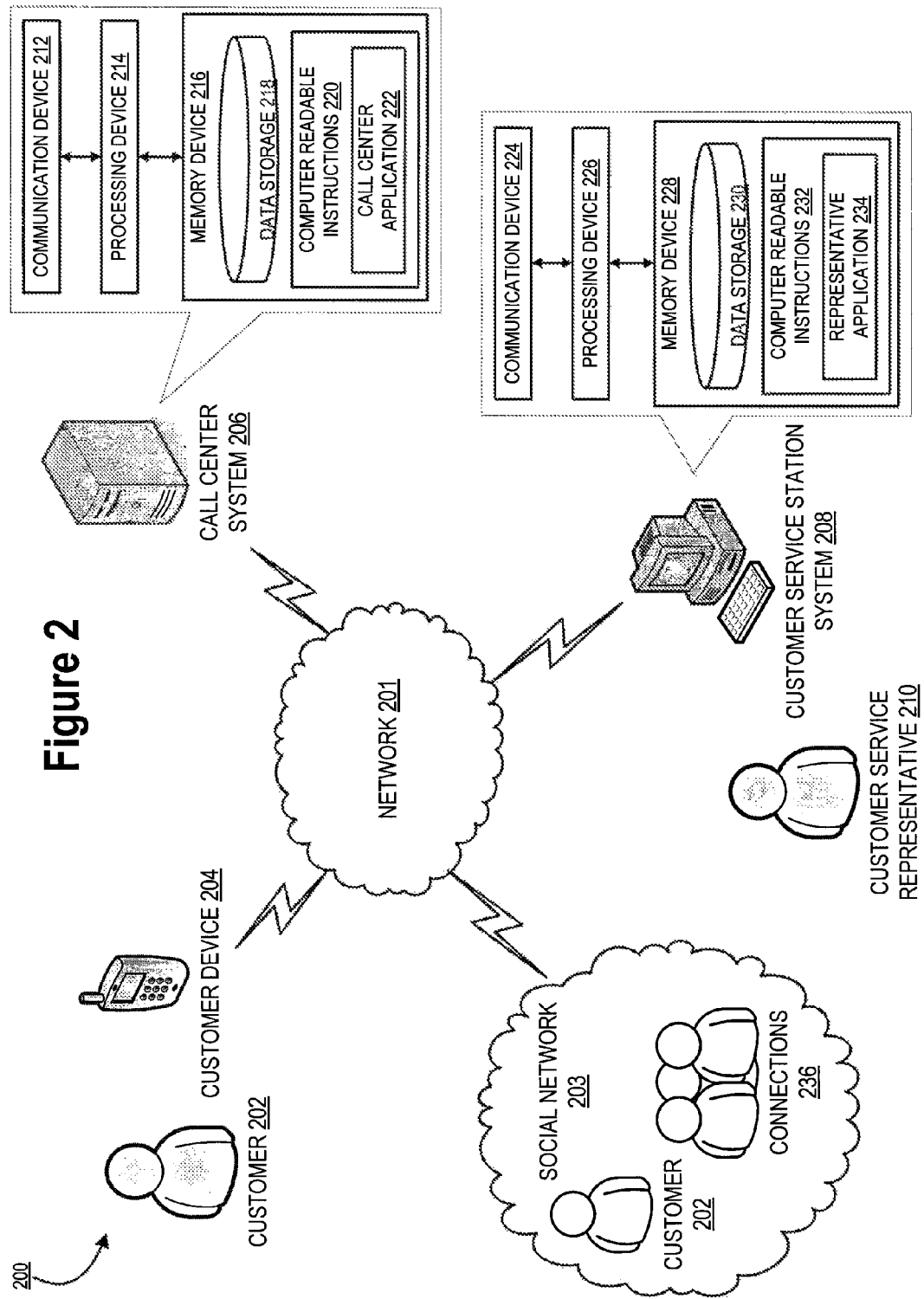
Figure 3:
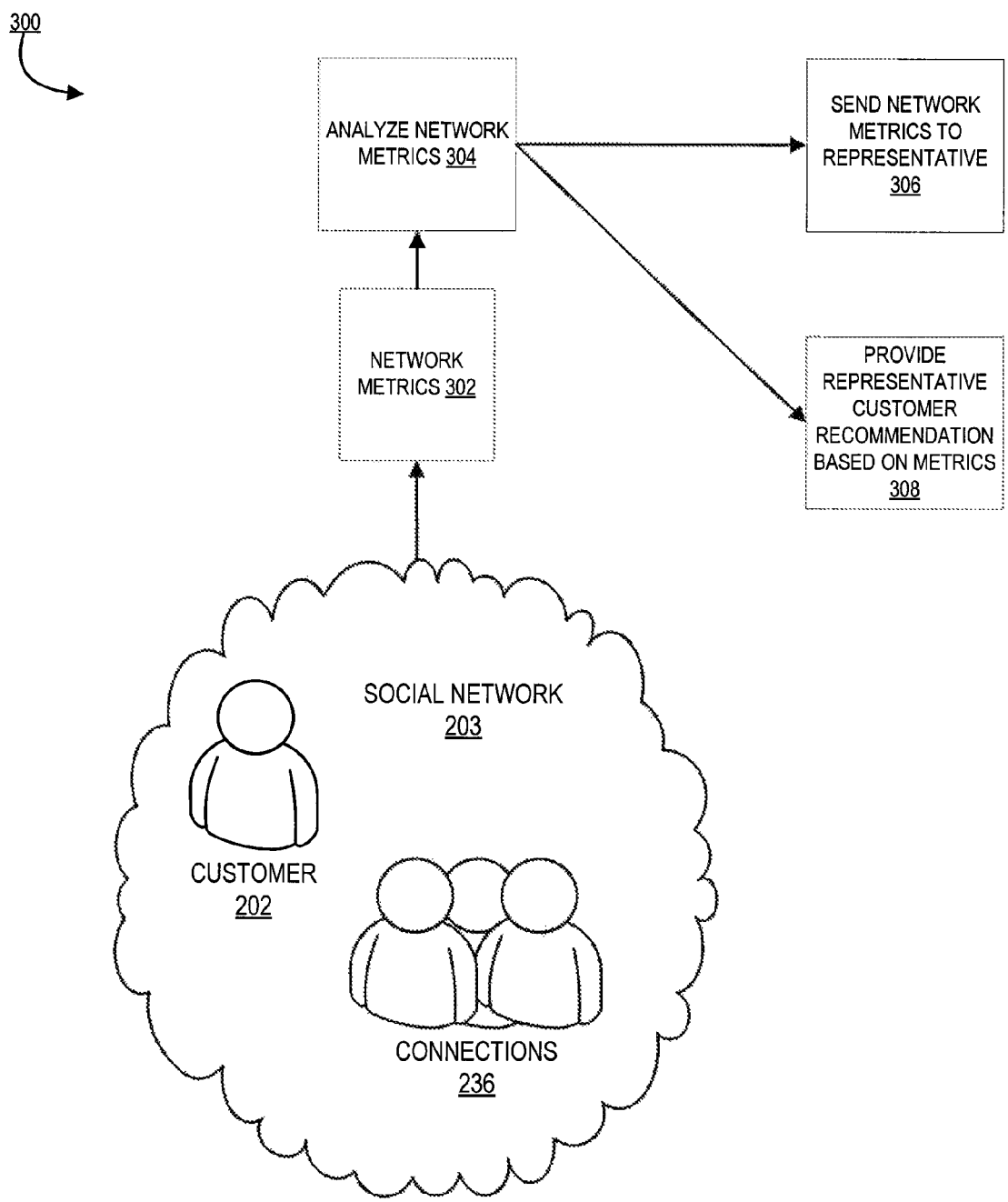
Figure 4:
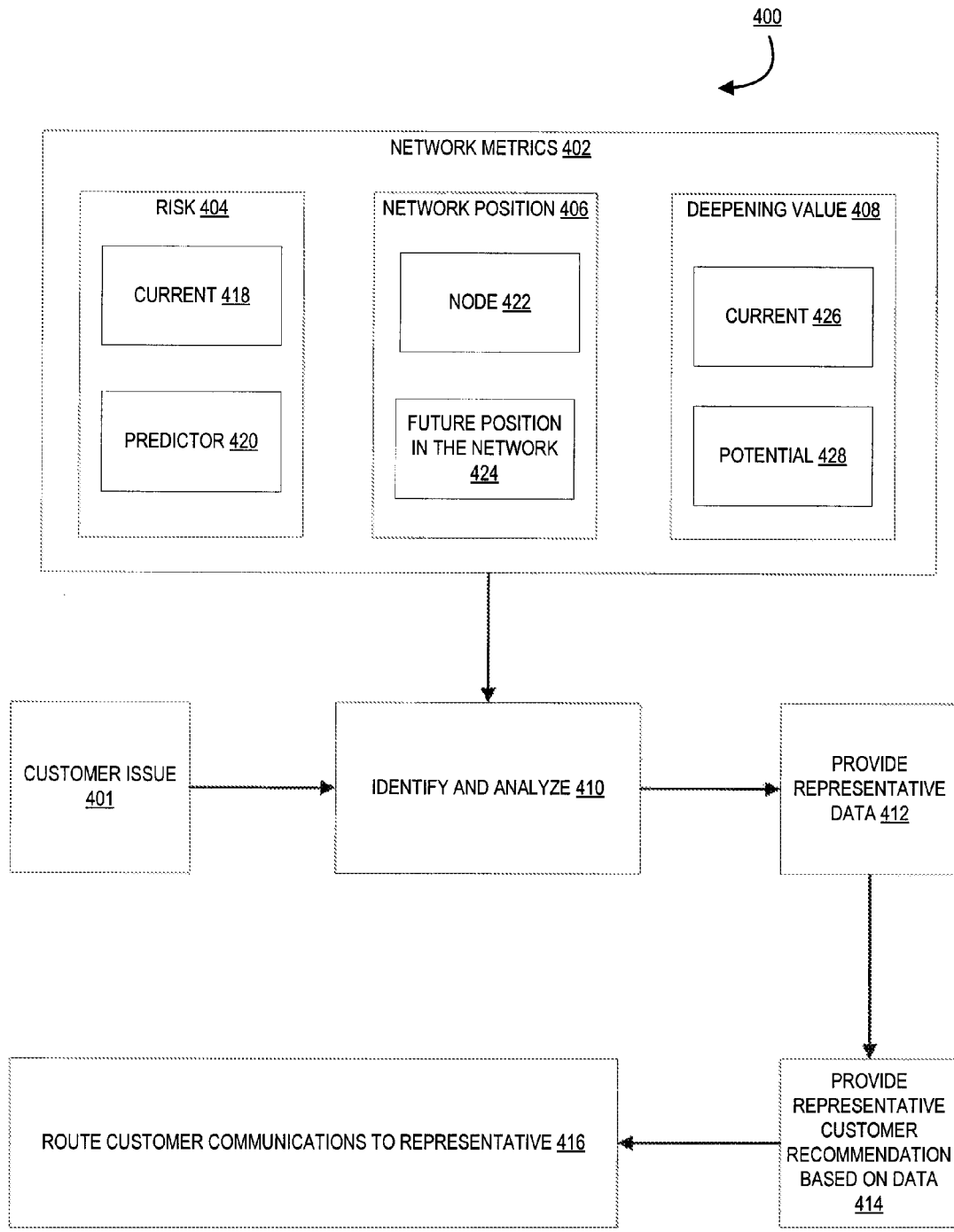
Figure 5:
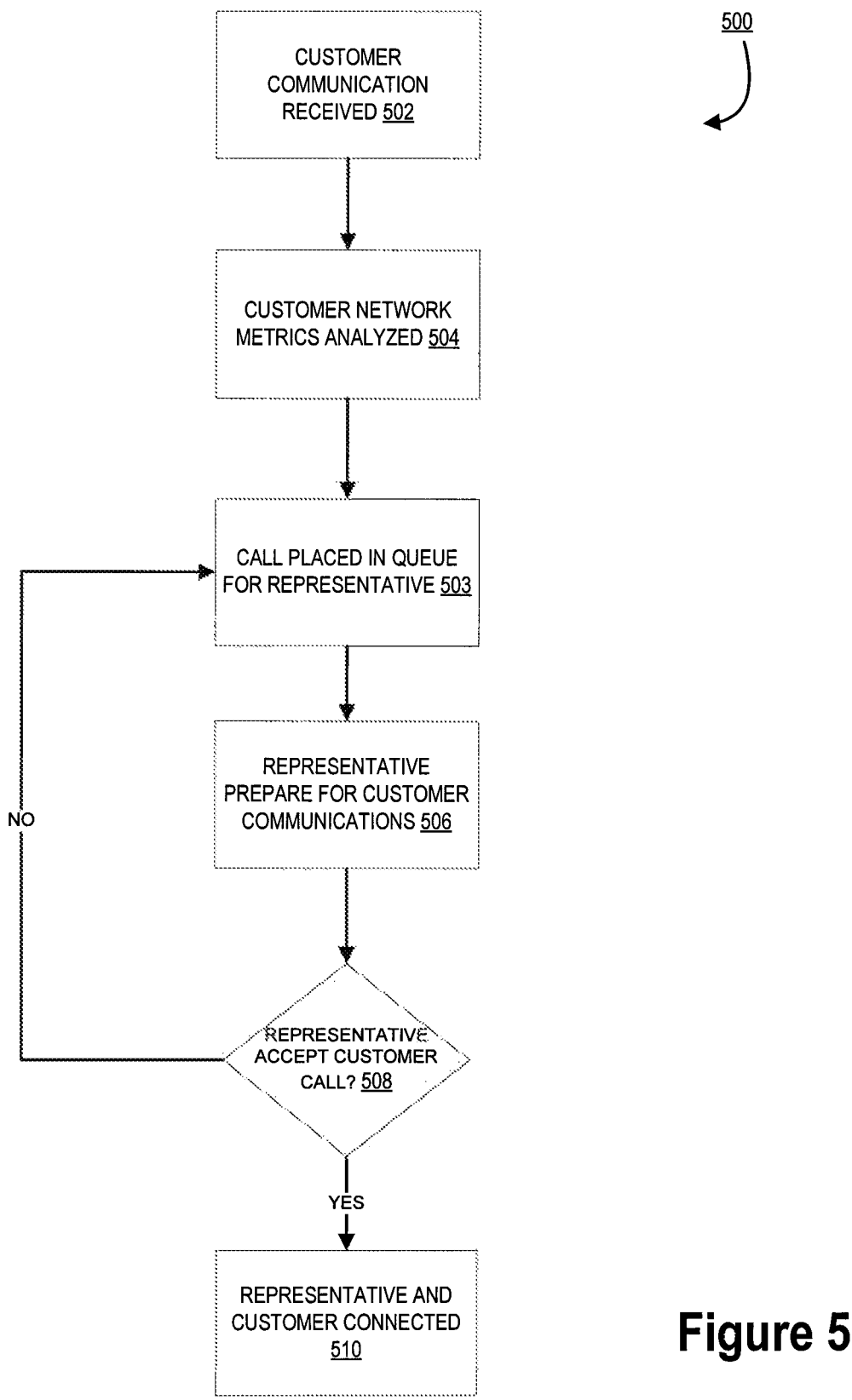
Figure 6:
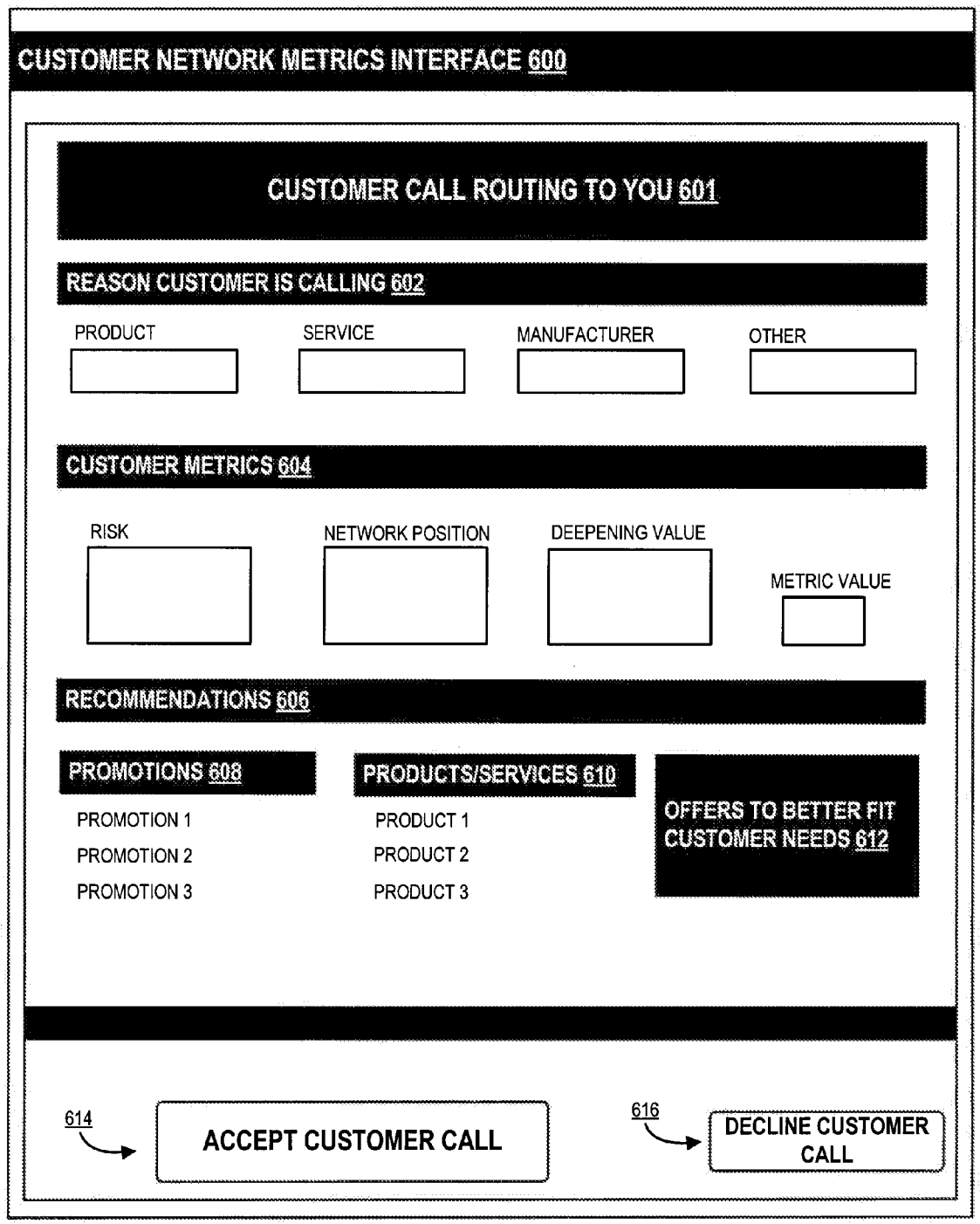

Having thus described embodiments of the invention in general terms, reference will now be made the accompanying drawings, wherein:

FIG. 1 provides a high level process flow illustrating a network value determination process, in accordance with one embodiment of the present invention;

FIG. 2 provides a network value determination for call center communications program system and environment, in accordance with one embodiment of the present invention;

FIG. 3 provides a high level process flow illustrating a network value determination for call center communications program process for receiving network metrics, in accordance with one embodiment of the present invention;

FIG. 4 provides a process flow illustrating a network value determination for call center communications program process for analyzing network metrics, in accordance with one embodiment of the present invention;

FIG. 5 provides a high level process flow illustrating the network value determination for call center communications program queuing process, in accordance with one embodiment of the present invention; and FIG. 6 provides a customer network metrics interface, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "call center," one of ordinary skill in the art will appreciate that other embodiments of the invention may involve other businesses that take the place of or work in conjunction with the call center to perform one or more of the processes or steps described herein as being performed by a call center. The call center may be any location where a business may receive customer communications regarding the business' products, services, etc., such that the call center may provide service to a customer.

It will also be understood that "social network" as used herein, generally refers to any social structure made up of individuals or organizations which are connected by one or more specific types of interdependencies, such as kinship, friendship, common interest, financial exchanges, working relationships, dislikes, relationships, beliefs, knowledge, prestige, geographic proximity, and/or the like. The social network may be a web-based social structure or a non-web-based social structure. In some embodiments, the social network may be inferred from financial transaction behavior, mobile device behaviors, etc. In this way, the social network may be a network unique to the invention or may incorporate already-existing social networks.

Further, it will be understood that "connection" or "connections" as used herein within the context of a social network refers to one or more members of an individual's social network. For example, an individual's family members or friends may be considered individually as a connection within the individual's social network or collectively as the individual's connections.

FIG. 1 illustrates a high level process a high level process flow illustrating a network value determination program process 100 for providing to a customer, based on network metrics of the customer, which will be discussed in further detail throughout this specification with respect to FIG. 2 through FIG. 6. A network value is a determination of network metrics of a customer, such that a customer service representative may provide a recommendation based on the metrics. If the customer has a high value, the recommendation may be more appealing to the customer than a recommendation giving to a lower valued customer. As illustrated in block 102, the network value determination program process 100 according to one embodiment includes receiving, at a call center, customer communications. Customer communications may be in the form of a telephone call, email, text message, video message, or other types of communication methods available to the customer to communicate to a call center.

Once the call center receives the customer communications as represented in block 102, the customer's issues are identified as represented in block 104. In this way, the call center may determine why the customer is calling the call center. The customer issue may be provided by the customer or by other means established by the call center. Customer issues that are provided by the customer may be provided in several ways include answers to automated questions, product survey responses, replacement part orders, safety inquiries, product control inquiries, warranty submissions and these can take the form of voice communications, text communications, video communications, and/or the like. Customer issues may also be determined after contact is made with the call center by an automated system, operators, or customer service representatives. In this way, a customer may communicate the reason he/she is calling using several different means of communication, including but not limited to voice, text, video, or other communication means.

Identifying the customer's issue provides the call center system the ability to determine the reasons why the customer is calling. For example, one customer may be calling because of a defect in a product while another customer may be calling complaining about the customer service at a local store. Each of these customers may require unique customer service representatives to effectively remediate the different issues. In this example, one customer may contact the call center with a concern about a defect in the product and another customer may contact the call center with a concern about customer service at a local store.

Once the customer issue is determined, the call center system may analyze customer network metrics in block 106. Network metrics include risk, network position, and the deepening value of the customer. Network metrics are based on customer's membership in social networks, which provide indications of current and future behavior of the customer. For example, if the customer has several pictures on a social networking page of fishing, then the network metrics may provide an indication that the customer likes to fish. In this invention, the behavior may primarily be financial behavior or behaviors that lead to predictable financial decisions. Predictable financial decisions may include the time/location of purchasing specific products, investment predictability, payment of loans, etc. predictability, or the like. The network metrics builds a value based on risk, network position, and deepening value. Analyzing the network metrics, in block 106, is done using network science algorithms.

In block 108 the network metrics and, in some instances, a value determined therefrom are provided to the customer service representative, such that the customer service representative may review the network metrics of the customer. Along with the network metrics the customer service representative is provide in block 108, the customer service representative is also provided recommendations for the customer in block 110. The recommendations are based on network metrics and may be provided to the customer service representative to give to the customer. This recommendation may be in many forms. Recommendations may relate to product or service about which the customer is calling, similar products or services, non-related products, services, offers, discounts, or regarding other recommendations.

After the customer issue has been identified 104, customer network metrics have been analyzed 106, the customer service representative has been provided the customer's network metrics, and the customer service representative has received a recommendation based on the network metrics 110, the customer communication is routed to a customer services representative, in block 112. In some embodiments, the communications from the customer may be placed in a queue for routing the call to the appropriate customer service representative. In other embodiments, the communications from the customer may be directly routed to a customer service representative. The customer service representative may also receive information regarding the customer, information regarding the customer's issue, and information regarding the customer's network metrics, prior to the customer service representative accepting the call from the customer. In some embodiments, the customer service representative may proactively preempt the custom's communication to the call center by contacting the customer if network metrics determine that a customer may be having issues with a recently purchased product. For example, if a customer has posted several complaints about a product on his/her social network site, the system may recognize these posts and preemptively contact the customer in regards to the product.

FIG. 2 provides network value determination for call center communications program system and environment 200, in accordance with one embodiment of the present invention. As illustrated in FIG. 2, the call center system 206 is operatively coupled, via a network 201 to the customer service station system 208, the social network 203, and the customer device 204. In this way, the call center system 206 can send and receive information to and from the customer service station system 208, the social network 203, and the customer device 204, to determine network metrics of a customer 202, such that a customer service representative 210 may be able to provide the customer 202 recommendations based on the metrics. FIG. 2 illustrates only one example of a network value determination for call center communications program system and environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination of wireline and wireless communication between devices on the network.

In some embodiments, the customer 202 is an individual that has a connection with the products or services that the call center represents and may desire to contact the call center in regards to the products or services. In some embodiments, the customer 202 is a merchant that has a connection to the products or services that the call center represents and may desire to contact the call center in regards to the products or services. In yet other embodiments, the customer 202 may not have a connection with any products or services, but may wish to contact a call center for information. The information may be based on any product, service, business, manufacturer, entity, financial institution, or the like, for which the call center provides call receiving functionality.

In some embodiments, the call center may be associated with the entity. In other embodiments, the call center may be the entity for whom it provides call receiving functionality. For example, the call center may provide call receiving capabilities for products provided by a manufacturer. In this way, a customer 202 may have purchased a manufacturer's product and may be directed to contact the call center if an issue arises with that manufacturer's product. The call center may be associated with the manufacturer of the product, the call center may be the manufacturer of the product, or the call center may be independent of the manufacture of the product. In another example, the call center may provide call receiving capabilities for services. The services may be provided by any number of entities, including, but not limited to retailers, financial institutions, business entities, merchants, and/or the like. For example, a customer 202 may have an issue regarding an investment with a financial institution. The customer 202 may be directed to the call center, such that the call center may answer the customer's questions regarding the investment. The call center may be associated with the financial institution, the call center may be the financial institution, or the call center may be independent of the financial institution.

In some embodiments, the customer service representative 210 is an individual that receives calls at a call center. The customer service representative 210 may have specific expertise in which to provide aid to customers 202 with specific issues that relate to products, services, or the like. In some embodiments, the customer service representative 210 may be a system or machine capable of audio response. For example, the customer service representative 210 may be a natural language processing ("NLP") system which can understand and recognize the customer's 202 issue and provide a response based on indications that the customer 202 provides. In this way, the customer 202 may be provided a response to his/her issue from an automated system, such that the automated system provides the response that is unique to the customer's 202 reason for calling. The NLP system may offer recommendations based on network metrics of the customer 202 through communications with the customer 202 or access to the customer's social network 203, such that the NLP system may provide a positive experience for a customer 202 no matter the customer's 202 rationale for calling the call center. The NLP system retrieves information from the social network 203 by communications through the call center system 206 such that the NLP may access and retrieve any social networking data relating to the customer 202.

As illustrated in FIG. 2, the call center system 206 generally comprises a communication device 212, a processing device 214, and a memory device 216. As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 214 is operatively coupled to the communication device 212 and the memory device 216. The processing device 214 uses the communication device 212 to communicate with the network 201 and other devices on the network 201, such as, but not limited to the customer service station system 208, social network 203, and the customer device 204. As such, the communication device 224 generally comprises a modem, server, or other device for communicating with other devices on the network 201.

As illustrated in FIG. 2, the call center system 206 comprises computer-readable instructions 220 stored in the memory device 216, which in one embodiment includes computer-readable instructions 220 for a call center application 222. In some embodiments, the memory device 216 includes data storage 218 for storing data related to network value determination for call center communications program including, but not limited to the data created and/or used by the call center application 222.

As illustrated in FIG. 2 and described throughout much of this specification, the call center application 222 provides retrieving and analysis of network metrics, such that the customer service representative 210 may be able to provide the customer 202 recommendations. The recommendations may be provided from the call center application 222 to the customer service representative 210 through a display on the customer service station system 208. The recommendations may be based on the customer 202 issue or any one of the network metrics. Prior to retrieving and analyzing the network metrics of the customer 202, the call center application 222 may determine the issue for which a customer 202 is contacting the call center. This disclosure is writing in terms of a customer 202 contacting the call center via "calling" the call center. However, a customer 202 may contact the call center in several ways, including but not limited to a telephone call, emailing, text messaging, video messaging, or other types of communication methods available to the customer 202.

In some embodiments, the call center application 222 allows for identification of issues for which the customer 202 is calling the call center. As explained above, the call center may respond to calls from customers 202 of many different entities and consequently the issue for which the customer 202 is contacting the call center may not be known to the call center upon initially receiving a call from the customer 202. The call center may determine the issue for which the customer 202 is calling the call center using many means, including but not limited to, automated questions, keypad indicators, an NLP system, an operator, etc.

In some embodiments, as explained in further detail below, the call center application 222 may retrieve and provide an analysis of network metrics, such that a network value may be provided to the customer service representative 210 for the customer 202. Network metrics may be retrieved by the call center application 222 from the social network 203. Network metrics provide indications of the characteristics of the customer 202 and more specifically current and future behavior of the customer 202. In some embodiments, the network metrics may determine, preemptively, if a customer service representative should contact the customer 202. Network metrics are classified as risk, network position, and deepening value of the customer 202 and these classifications are explained in more detail below, with respect to FIG. 4. In some embodiments, the behavior may primarily be financial behavior or behaviors that lead to predictable financial decisions. In other embodiments, the behavior may be based on products or services purchased or "liked" by the customer 202. In yet other embodiments, the behavior may be based on crowd identification information. Crowd identification information provides the system with an indication as to why other customers are contacting the call center. Therefore, the system might be able to predict the reasons the current customer 202 is contacting the call center. These behaviors are predicted based on network metrics. Network metrics provide an analysis of customer 202 behavior based on the customer's social network 203. The network metrics builds a value from the social network 203 based on the customer 202 and his/her affinity with respect to risk, network position, and deepening value. The call center application 222 analysis is done using network science algorithms by examining the social network pages of the customer 202. Furthermore, network metrics are time sensitive.

Network metrics include a measurement of risk, network position, and deepening value of the customer 202. Risk may be measured both with respect to current risk as well as predicted future risk. For example, the call center application 222 may recognize from a customer's network metrics, based on the social networking page that the customer 202 may have previously suffered an injury. The customer 202 may have pictures of a hockey injury or a snow boarding injury on his/her social networking pages. In this way, the call center application 222 may be able to provide recommendation based on the network metrics.

Network position identifies the customer's 202 position within a network of friends. The customer's 202 network position may be based the customers node or future position in the network. In today's society, friends typically have common interests or hobbies. For example, the customer 202 may play golf regularly. Based on this information, the customer's 202 social networking friends, or at least a population of his/her social networking friends, may also play golf regularly. In this way, the customer 202 may be in a position, or node, of his/her social network to influence the decisions of his/her friends, friends of friends, or friend's friends (i.e., $2^{nd}$ degree connection and beyond). The call center application 222 may recognize the customer's 202 influential node of his/her social network and thus provide recommendations or promotions for specific golf apparel. The promotions may influence the customer's 202 social networking friends, friends of friends, or friend's friends to purchase the same golf apparel. In another example, the call center application 222 may identify the customer 202 as not being an influential node of the social network, but that he/she is a friend of several influential individuals, or social networking nodes. The call center application 222 may identify the customer's 202 position as being friends with several influential individuals, and thus provide recommendations or promotions to the customer 202 based on his/her network position.

Deeping value identifies customers 202 that may provide future value, potential revenue, or the like to the entity using the call center. For example, the call center may provide customer service for a financial institution. The call center application 222 may determine that the network metrics of the customer 202 may provide future revenue for the financial. An example of a customer 202 that may provide deepening value for a financial institution may be an individual customer 202 whom is recently graduating from a college or university with an advanced degree. For example, a customer 202 that is graduating from a top medical school may be expected to make large investments, home purchases, etc. in the future that the financial institution may wish to provide. In this way, the call center application 222 may recognize this deepening value and provide the customer service representative indications as to a customer 202 recommendation, such that the customer service representative may convey the recommendation to the customer 202. This way the customer 202 may receive promotions from the financial institution when he/she places the call to the call center, thus may be more likely to seek out that financial institution when future investing or financial decisions for the customer 202 occur. In addition to the forgoing other customer 202 specific indicators can also be used to provide a recommendation to the customer 202.

In some embodiments, the call center application 222 retrieves data from all network metrics, including risk, network position, and deepening value metrics. In other embodiments, the call center application 222 retrieves data from only some of the available network metrics. In yet other embodiments the call center application 222 retrieves data from a single network metrics. The call center application 222 may then determine a recommendation based in part on one, some, or all of the network metrics retrieved. The determination of a recommendation is based on a network system algorithm. The call center application 222 may then provide the network metrics to the customer service station system 208, such that the customer service representative may review the network metrics on a display on the customer service station system 208. In other embodiments, the value established from the network metrics is provided to the customer service station 208. Along with this data, the call center application 222 provides a recommendation for the customer 202 to the customer service station system 208, such that the customer service station 208 may provide an indication of the recommendation, network metrics, and network value to the customer service representative 210.

Once the call center application 222 retrieves the network metrics, determines a recommendation based on the network metrics, and provided the data to the customer service station system 208, the call center application 222 allows for the customer 202 communications to be routed to and/or placed in a queue at a customer service station system 208 for the customer service representative 210 to subsequently answer. In some embodiments, the customer service representative 210 may be a representative that has fielded communications from that customer 202 before. In this way, the customer service representative 210 may have built a prior relationship with the customer 202 such that the customer 202 may be provided a positive call center experience if the customer 202 speaks with that customer service representative 210. The customer service representative 210 may receive information through the customer service station system 208 that relates to the customer 202 communication being routed to him. The information on the customer service station system 208 may display information regarding the network metrics, the value established from the network metrics, and/or the recommendation based on the network metrics for the customer 202.

As illustrated in FIG. 2, the customer service station system 208 is generally comprised of a communication device 224, a processing device 226, and a memory device 228. The processing device 226 uses the communication device 224 to communicate with the network 201 and other devices on the network 201, such as, but not limited to the call center system 206, the customer device 204, and the social network 203. As such, the communication device 224 generally comprises a modem, server, or other device for communicating with other devices on the network 201. The communication device 224 may also provide for voice communications along the network 201, such that the customer service representative 210 may use the customer service station system 208 to speak to a customer 202 using a customer device 204.

As illustrated in FIG. 2, the customer service station system 208 comprises computer-readable instructions 232 stored in the memory device 228, which in one embodiment includes computer-readable instructions 232 for a representative application 234. In some embodiments, the memory device 228 includes data storage 230 for storing data related to the network value determination for call center communications program including, but not limited to data created and/or used by the representative application 234.

In the embodiment illustrated in FIG. 2, the representative application 234 allows the customer service representative 210 to receive network metrics data, network metrics values, and recommendations from the call center system 206. The representative application 234 may allow for the communication device 224 of the customer service station system 208 to receive data from the call center system 206. In some embodiments, the representative application 234 provides the customer service representative 210 the ability to send data to the call center system 206. For example, the customer service representative 210 may wish to take a break or decline to answer a customer 202 communications for any number of reasons. In this way the customer service representative 210 may provide the customer service station system 208 an indication that the customer service representative 210 cannot accept customer's communication. The representative application 234 can then communicate the customer service representative indication to the call center system 206 such that the customer service representative 210 may not receive calls for a specific period of time.

In some embodiments, the representative application 234 may receive data from the call center application 222 regarding the retrieving and analysis of the network metrics, the value determined therefrom, and recommendations to the customer 202. In yet other embodiments, the representative application 234 may retrieve data from a social network 203.

The data may then be provided to the customer service representative 210 via an interface, such as the interface illustrated in FIG. 6, displayed on the customer service station system 208. The interface may provide the customer service representative 210 data that the customer service representative 210 may review prior to responding to the call from the customer 202. In this way, the customer service representative 210 may know the issue on which the customer 202 is calling, the network metrics, and the possible recommendations the customer service representative 210 may provide to the customer 202. In this way, once the customer service representative 210 fields the call from the customer 202, the customer service representative 210 is prepared to discuss the issue with the customer 202 and provide the customer 202 recommendations. In some embodiments, the recommendations may be based on the issue the customer 202 is contacting the call center for, such as a recommendation of how to solve the issue. In other embodiments, the recommendation may be for a similar product or service in relation to the product or service that is the subject of the customer 202 issue. In yet other embodiments, the recommendation may be for a different product or service in relation to the product or service that is the subject of the customer 202 issue.

The representative application 234 may also provide the customer service representative 210 the ability to communicate with the customer 202. The customer service representative 210, once accepting the request to field a call from a customer 202 may communicate with the customer 202 through the use of the customer service station system 208. The representative application 234 may receive an indication of the customer service representative acceptance of a customer 202 call and request the communication device 224 to communicate with a customer 202, through the use of a customer device 204 over a network 201. In this way, the customer service representative 210 may communicate with the customer 202 using several different means of communication, including but not limited to voice communications, text communications, email communications, video communications, and/or the like.

The representative application 234 may further provide for customer service representative 210 access to the social network 203. In this way, the customer service representative 210 may re-affirm the data retrieved by the call center system 206 or search for other indicators from the social network 203. For example, if the customer 202 starts to discuss a topic completely different than the originally presented issue or an issue that requires recommendations that are different than the recommendations provide. The customer service representative 210 may search the social network 203 with respect to the new topic. The customer service representative 210 may also send a request to the call center system 206 for a new recommendation based on any new topics the customer 202 may bring up. In this way, the call center system 206 may provide a recommendation based on any topic the customer 202 desires to discuss with the customer service representative 210.

The customer device 204 is operatively coupled to the call center system 206, the customer service station system 208, and the social network 203 through the network 201. The customer device 204 has systems with devices the same or similar to the devices described for the call center system 206 and the customer service station system 208 (i.e., a communication device, a processing device, and a memory device). Therefore, the customer device 204 communicates with the call center system 206, the customer service station system 208, and/or the social network 203 in the same or similar way as previously described with respect to each system. The customer device 204, in some embodiments, provides the customer 202 with several different means of communication with a customer service representative 210, including but not limited to voice communications, text communications, email communications, through a social networking site, video communications, and/or the like. In this way, there are several means in which a customer 202 may communicate with a customer service representative 210, such that the customer service representative 210 may provide assistance to the customer 202. The customer device 204 may also provide, in some embodiments, the customer 202 with means of accessing, updating, or reviewing social networks of the customer 202.

The social network 203 is operatively coupled to the call center system 206, the customer service station system 208, and the customer device 204 through the network 201. In this way, the call center system 206, the customer service station system 208, and the customer device 204 may all access the social network 203. The social network 203 generally refers to any social structure made up of individuals or organizations which are connected by one or more specific types of interdependencies, such as kinship, friendship, common interest, financial exchanges, working relationships, dislikes, relationships, beliefs, knowledge, prestige, geographic proximity, and/or the like. The social network may be a web-based social structure or a non-web-based social structure. In some embodiments, the social network may be inferred from financial transaction behavior, mobile device behaviors, etc. In this way, the social network 203 may be unique pages of the customer 202 on already-existing social networks such as Facebook®, Twitter®, Linkedin®, YouTube®, as well as any one or more existing web logs, blogs, forums, and/or other social spaces.

The social network 203 is made up of the customer 202 and the customer's connections 236. Connections may be any "friend" the customer 202 may have on a social network 203, any product or service the customer 202 has "liked" on a social network, or any other aspect of the social network 203 that connects the customer 202 to another individual, an entity, a product, a service, an organization, and/or the like. Connections may be in the form of a first degree connection, a second degree connection, a third degree connection, or a subsequent degree of connection. In this way, the customer 202 is placed as the central node within his/her social network 203 with his/her first degree connections directly connected to him/her, followed by his/her second degree connections being connected to his/her first degree connections, etc. The customer 202 may also be a second degree connection, a third degree connection, or a subsequent degree of connection within his/her friends, friends of friends, or friend's friends social networks 203. In this way, the call center system 206 may analyze the social networks where the customer 202 is the central node as well as all the social networks 203 where the customer 202 is in a second degree connection, in a third degree connection, or in a subsequent degree of connection to, in order to determine network metrics of the customer 202. The rationale for reviewing social networks where the customer 202 is the central node and social networks where the customer 202 is not the central node, but is within a defined degree of connection, is because nodes within a defined degree of connection typically emulate each other. For example, the customer 202 may "like" sports on his/her social network 203 pages. Typically, his/her first degree, second degree, and to some extent third degree connections are more likely than not to also "like" sports on their social network 203 pages. In this way, the customer 202 may be in a position, or node, of his/her social network to influence the decisions of his/her friends, friends of friends, or friend's friends. Therefore, the call center system 206 may analyze these connections and provide a recommendation to the customer 202 that may not only benefit the customer 202, but also effect the decision making of his/her connections. The analysis of the connections and social network 203 data in general, may be time sensitive. In this way, recent posts, friends, "likes," etc. may be considered by the system as being more important than posts from several years ago, when determining network metrics.

In another example, the call center may be associated with an entity. Although, based on network metrics, the customer 202 may not have a high network value for that entity. Network metrics may also recognize that the customer 202 may have several social network 203 connections that may have high network values for the entity. Therefore the entity may choose to provide a recommendation in the form of a promotion, to the customer 202, even though the customer 202 may not have a high network value. This is because the customer 202 may influence others within his/her social network, the others may have a high network value. Thus, the promotion to the customer 202 may reciprocate to the customer's 202 social networking friends with a higher network value.

Although only a social network 203 is depicted in FIG. 2, the network value determination for call center communications program system and environment 200 may contain numerous social networks 203.

It is understood that the servers, systems and devices described herein illustrate one embodiment of the invention. It is further understood that one or more of the servers, systems, and devices can be combined in other embodiments and still function in the same or similar way as the embodiments described herein.

FIG. 3 illustrates a high level process flow illustrating a network value determination for call center communications program process for receiving network metrics 300. The social network 203, as described in more detail above with respect to FIG. 2 includes the customer 202 and the customer connections 236, is accessed by the call center system 206 and the call center system 206 retrieves network metrics from the social network, in block 302. The network metrics may include risk, network position, deepening value, and/or other date depending on the issue on which the customer 202 is contacting the call center. As represented in block 304 the network metrics are analyzed by the call center system 206 using a network science algorithm to determine current and future risk, network position, and value of the customer based on the customer's 202 social network 203.

Once the call center system 206 has retrieved and analyzed the network metrics the network metrics are sent to the customer service representative 210 via the customer service station system 208, in block 306. Along with the network metrics, a value associated with the network metrics may also be sent to the customer service representative 210. A value may be a numerical value or another discretionary value indicating how valuable the customer 202 may be, based on his/her social network 203. For example, the customer 202 may not purchase many products from an entity, thus on its face, the customer 202 may not be a valuable customer of the entity. However, the customer 202 may be the central node within a social network 203. The social network 203 may include several first and second degree friends of the customer 202 who are do purchase large amounts of products from the entity. Therefore, the customer 202, although not a valuable customer to the entity, with respect to amount of products purchased, may be a valuable customer to the entity based on his/her influence of his/her social network friends (connections 236 within his/her social network 203), that do purchase large amounts of products from the entity.

Once the call center system 206 has retrieved and analyzed the network metrics a recommendation is provided to the customer service representative 210 via the customer service station system 208, in block 308. The recommendation may be sent to the customer service station system 208 from the call center system 206 and be provided to the customer service representative 210 via an interface presented on a display of the customer service station system 208. The recommendation may be in many forms. Recommendations may be regarding the product or service that the customer is calling about, regarding similar products or services, regarding non-related products or services, or regarding other recommendations. The recommendation may include recommendations on how to correct the issue the customer 202 is contacting the call center about, promotions, discounts, offers, and/or the like. Recommendations may be beneficial to the customer 202. For example, a call center associated with a financial institution may be able to provide a loan recommendation to the customer 202 for a lower interest than his/her current loan. In another example, a call center associated with a financial institution may be able to provide an offer of a waiver for a payment missed on a loan or credit card. Providing these recommendations may allow a customer service representative 210 to make a call center experience, a beneficial or positive experience for the customer 202.

FIG. 4 illustrates a process flow for network value determination for call center communications program process for analyzing network metrics 400, in accordance with one embodiment of the invention. In block 401 the customer issue is determined. In this way, the call center system may provide an indication as to why the customer 202 is calling the call center to the customer service representative 210 and also aids the call center system 204 in predicting a recommendation for the customer 202.

The customer issue may be provided by the customer 202. Customer issues that are provided by the customer 202 may be provided by answers to automated questions, product survey responses, warranty submissions, voice communications, text communications, video communications, and/or the like. The call center may determine the customer issue by use of an automated system, an operator, or a customer service representative 210. In this way, the customer 202 may communicate his/her issue to the call center use voice, text, video, or other communication methods.

As illustrated in FIG. 4, network metrics 402 and the customer issue 401 may be identified and analyzed in block 410. Network metrics 402 may include risk metrics 404, network position metrics 406, and deepening value metrics 408. Network metrics are established by analyzing social networks 203 of the customer 202 and the customer's 202 friends. For example, pictures, "likes", posts, blogs, notes, etc. of the customer 202 and connections 236 of the customer may provide a multitude of data to a call center, such that the call center may be able to provide satisfactory customer service to the customer 202 and recommendations that may benefit the customer 202. The network metrics provided to the customer service representative 210 may change to the way a customer service representative 210 may respond to a customer 202 communications. The network metrics may also provide a recommendation for the customer 202. In some embodiments, call center system 206 provides several recommendations to the customer service representative 210 to offer to the customer 202. The several recommendations may be in order of preference. The order of preference may be established by the network metrics analyzed and the value therefrom. For example, if there are many metrics that suggest the customer 202 plays golf and only a few metrics that indicate the customer 202 plays softball, the call center system 206 may place a golf recommendation over a softball recommendation in order of preference. In other embodiments, the preference is determined by the issue the customer 202 is contacting the call center as well as the network metrics. For example, if the network metrics indicate the customer 202 plays golf and softball, but the customer 202 is calling the call center in regard to a financial statement, the recommendation more preferred may be a recommendation for a new credit card for the customer 202. In yet other embodiments, recommendations may be base off of current trending data, such as what other customers 202 are contacting the call center about. For example, if there is a popular product that may customers 202 are contacting the call center in regards to this product, the system may recommend this product due to the products popularity.

As illustrated in FIG. 4, network metrics 402 include risk metrics 404, network position metrics 406, and/or deepening value metrics 408. Risk metrics 404 predict the customer's 202 likelihood of risk based on his/her social network 203. Risk metrics 404 may provide an indication of many different types of customer 202. Financially, this could include investment strategy. For example, if a customer 202 calls a call center to discuss investments and the network metrics 402 indicate that the customer 202 is a risk adverse investor, the call center system 206 may offer recommended funds that may match the customer's investment strategy. These may also include allowing for increases in the customer's 202 credit line, and the like. Health risks may provide a call center system 206 network metrics 402 regarding health and lifestyle of the customer 202. For example, the social network 203 may indicate the customer 202 and/or his/her connections are runners. Because of this the call center system 206 may recommend a more beneficial health insurance to the customer 202 based on the customer's 202 healthy lifestyle. The call center system 206 may also provide a promotion for running apparel based on this network metric. Health risks may also show that the customer 202 is a smoker, but has indicated several times that he/she is trying to quit smoking on his/her social network 203. The call center system 206 may be able to recommend other ways to quit smoking, incentives for quitting, etc. Insurance and warranty metrics provide an indication of insuring or providing warranty or extended warranty coverage to the customer 202. For example, if the customer's 202 social network 203 indicates that the customer's 202 vehicle is clean and he/she takes extensive care of his/her vehicle. The call center system 203 may recommend offering the customer 202 a more beneficial vehicle insurance based on his/her behavior and care he/she attributes to his/her vehicle. Risk metrics 404 may be in the form of current 418 and predictor 420 categories. A current 418 category of risk metric 404 provides an indication at the current time, whereas the predictor 420 category of risk metric 404 predicts the future.

Network position 406 provides an indication as to the position the customer 202 is in within a social network 203 or group of social networks 203. Network position 406 considers close social network connections, such as family members and friends that comment or post on the customer's 202 social network 203. In this way, the network position 406 determines how likely the customer 202 is to pursue a specific behavior. For example, if an individual posts on the customer's 202 social network 203 several times in a week, this may indicate a close connection between the customer 202 and the individual. Therefore, the behaviors indicated on the individual's social network 203 may also be behaviors of the customer 202. In this way, an entity may target a customer 202, even if the customer 202 is not a regular shopper at that entity, based on his/her connections with other individuals, thus to attract the other individuals to the entity. However, if an individual only posted one time on the customer's 202 social network 203 and that post was three years ago, the system may recognize that there is not a close connection between the individual and the customer 202. However, the system may examine other factors to conclude that there may not be a close connection between the individual and the customer 202. Thus the system may not just assume that because an individual does not post on the customer's 202 social network 203 there is not a close connection. In a financial institution, a customer 202 may have many assets at the financial institution. However, the friends and family members of the customer 202 may not have many assets with the financial institution, thus if the friends or family contacted the call center, they may not qualify for benefits that the customer 202 of the financial institution does qualify for. However, because the individual is a family member of the customer 202, the financial institution may wish to provide that individual the same or similar benefits offered to the customer 202.

Network position 406 further includes the current node 422 of the customer 202 and the customer's future position in the network 424. The current node 422 indicates where the customer 202 is within his/her social network as well as other individuals' social network 203. The customer 202 may be the central node of a social network 203. Thus, the customer 202 is the most influential individual within the social network 203. The customer 202 may not be the central node of the social network 203. In this way, the call center system 206 examines the influential individuals' within that social network to determine which recommendations to provide to the customer 202. The future position in the network 424 predicts whether the customer 202 may be an influential member of a social network 203. This may be due to the customer 202 graduating from college or graduate school, job indications, family positions, or other aspects that may be predictable factors of a customer 202 being a successful influencer within a social network 203. The customer's 202 network position 406 is a way of weighing the other network metrics 402, such that determining the recommendations may be based on the network position 406 of the customer 202.

Deepening value 408 provides an indication as to whether a recommendation will provide a value to the entity providing the recommendation. For example, does giving a customer 202 a large discount benefit the entity that is providing the large discount. This may be in the form of marketing, obtaining new customers 202, or retaining old customers 202. The deepening value 408 may be both a current deepening value 426 or a potential value 428. A current deepening value 426 indicates that the recommendation provided to the customer 202 may be instantly beneficial to the entity providing the recommendation. For example, if a customer 202 is influential within a social network 203, therefore most of the customer's 202 connections will emulate the purchases of the customer 202. Therefore the recommendation may provide a product or service to the customer 202 and instantaneously provide marketing and possibly new customers for the entity providing the recommendation. Potential deepening value 428 indicates a prediction that a recommendation provided by an entity may provide value to that entity later on. In this way, the entity may provide a recommendation based on network metrics 402 that indicate the recommendations may provided a value to the entity at some point once the customer 202 develops as an influential node within the social network 203.

In some embodiments, a single network metric 402 is analyzed. In other embodiments, all network metrics 402 are analyzed. In yet other embodiments, some of the network metrics 402 are analyzed. Further, many network metrics 402 may provide the same and/or similar data, the network metrics 402 may overlap in analysis, or the network metrics 402 may provide conflicting indications. In this way, the call center system 206 may determine the most appropriate recommendation or recommendations for the customer service representative 210 to provide to the customer 202. Although, any number of network metrics 402 may be analyzed, the call center system 206 or the customer service representative 210 may add to or combine the results from the network metrics 402 during customer 202 communications, such that new recommendations may be provided to the customer 202 based on the customer 202 real-time communications.

Once the network metrics 402 have been retrieved, the call center system 206 identifies and analyzed with network metrics with respect to the customer issue in block 410. The recommendation provided to the customer 202 is, in some way, associated with the customer issue 401. This way, the recommendation to the customer 202 is not completely unrelated to the issue of which the customer called. Thus the analysis of the network metrics 402 is not analyzing all data from every social network 203 within an unlimited number of degrees of connection. Once all data is identified and analyzed in block 410, the customer service representative 210 is provided the data in block 412. Once the customer service representative 210 is provided the data in block 412, in the way of the network metrics and customer issue, and the customer service representative 210 is provided the recommendations, the customer communication is either routed to the customer service representative 210 or placed in a queue for the customer service representative to accept the call, in block 416.

FIG. 5 illustrates a high level process flow illustrating the network value determination for call center communications program queuing process 500. First, the call center receives a communication from a customer 202, in block 502. Once the customer 202 has contacted the call center, the call center system 206 identifies the customer's issue and the customer's network metrics associated with that issue are analyzed in block 504. At block 503, once the customer issue is determined and customer network metrics are analyzed with respect to that issue, in some embodiments, the call center system 206 may place the customer's call in a queue for a customer service representative 210 to answer. In other embodiments, the customer communications is routed directly to the customer service representative 210 via the customer service station system 208 directly and not placed in a queue. Once the customer call is in the queue or is routed to the customer service representative 210, information regarding the network metrics and a recommendation is sent to the customer service representative 210 for review, in block 504. Once the customer service representative 210 receives the information, the customer service representative 210 may prepare for the customer communications, in block 506. The customer service representative 210 may prepare for the customer issue and see the recommendations by examining an interface, such as a customer network metrics interface 600, provided to the customer service station system 208 when the customer communication is in the customer service representative 210 queue or routed to the customer service representative 210.

FIG. 6 illustrates a customer network metrics interface 600 in accordance with embodiments of the present invention. The customer service representative 210 may receive the interface on the customer service station system 208 prior to accepting a customer communication. In this way, the customer service representative 210 may receive data regarding the customer 202 communication that is being routed to him or her, which allows the customer service representative 210 time to review the customer's reason for calling, network metrics, and recommendations for the customer 202. In this way, the customer service representative 210 may have an indication as to why the customer 202 is contacting the call center. Section 602 of the customer network metrics interface 600 provide a the customer service representative 210 indications as to why the customer 202 is calling the call center. The reasons the customer 202 is calling the call center may be due to a product, service, manufacturer, or another reason. If the customer 202 is calling in regard to a product, below the product line of the reason the customer 202 is calling section 602 may be a detailed indication of the customer issue. For example, the customer 202 may be calling in regard to product A. But more specifically, the customer 202 may be calling regarding a defective clasp on product A. In the customer call interface 600 at section 602 the customer service representative 210 may be provided, not only the information regarding the product that the customer 202 is calling for, product A, but the issue which the customer 202 has with the product, the defective clasp. In this way the customer service representative 210 may be provided detailed information as to the issue that prompted the customer 202 to contact the call center.

Once the customer service representative 210 is provided an indication as to the reason the customer 202 is calling the call center in section 602, in section 604 the customer service representative 210 is provided the customer's network metrics. The customer metrics section 604 includes an indication as to each customer metric including risk, network position, and deepening value. There may be a brief description of the network metrics provided below each metric or an internal code, such that the customer service representative 210 may see the customer metrics. For example, the customer 202 is contacting the call center in regard to a disputed credit card payment, the risk metric may indicate that the customer 202 always pays his/her credit card on time, thus there may be an issue with this payment. Subsequently a recommendation may be made to waive any assessment that may otherwise apply to the late payment. Along with the three customer metrics, a metric value is also provided in the customer metrics section 604. The metric value may be a numerical value or another internal code which indicates how often the metrics are displayed in the customer 202 social networks 203. The customer metrics 604 may provide variables with may change the way the customer service representative 210 may respond to the customer 202.

The customer network metrics interface 600 also provides recommendations for the customer service representative 210 may provide the customer, in section 606. In some embodiments, the recommendations are promotions, such as those illustrated in section 608. In section 608 the customer service representative 210 in this instance has three promotions to select from. The customer service representative 210 may offer all, some, or none of these promotions to the customer 202. The promotional offers are provided by the call center system 206 and are offers based on the customer 202 issue and the network metrics. For example, if the customer 202 is calling in regarding to a golf club recently purchased and the customer 202 is influential within a social network 203 associated with golf, the call center system 206 may provide the customer service representative 210, through the customer call interface 600, promotions for golf retailers, manufacturers, and/or courses. In some embodiments, the customer service representative 210 may have discretion as to whether to offer the customer 202 the promotions. In other embodiments, the call center system 206 indicates to the customer service representative 210 that the customer 202 may receive a promotion. In other embodiments, the recommendations 606 may include products and/or services 610. In section 610 the customer service representative 210 in this instance has three products to select from. The customer service representative 210 may offer all, some, or none of these products to the customer 202. The products are provided by the call center system 206 and are offers based on customer 202 issue and the network metrics. In yet other embodiments, the customer service representative 210 may, during the conversation with the customer 202 realize that the recommendations 606 are not directed towards the current discussion with the customer 202. In this way, the customer service representative 210 may select the offers to better fit customer needs in section 612 and the call center system 206 may provide the customer service representative 210 different recommendations 606. In yet other embodiments, recommendations 606 may also be recommendations for how to fix the issue the customer 202 is contacting the call center for.

Once the customer service representative 210 has reviewed the customer network metrics interface 600, the customer service representative 210 may accept the customer's call by selecting the accept customer call button 614. If the customer service representative 210 does so, the customer 202 is connected to the customer service representative 210 at that time. The customer service representative 210 may also decline the customer's call by selection the decline customer's call button 616.

As illustrated in FIG. 5, if the customer service representative 210 elects to accept the customer's call in decision block 508, the customer service representative 210 and the customer are connected to discuss the customer's issue, in block 510. However, if the customer service representative 210 elects not to accept the customer's call in decision block 508, the customer 202 communications is placed back into a queue or routed to a different customer service representative in block 503.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing responses to customer communications made to a call center, said method comprising:
    receiving an incoming customer communication, the incoming customer communication prompted by a question relating to a product or service;
    determining one or more social network profiles associated with a customer of the incoming customer communication;
    retrieving, using a computer processor, data from the determined one or more social network profiles, wherein the data comprises at least in part information relating to the customer, customer connections within a social network associated with the social network profile, and customer connections to the product or service;
    determining a preference of the customer based at least in part on the incoming customer communication and the data from the one or more social network profiles associated with the customer, wherein the preference comprises a customer interest associated with the product or service;
    determining one or more of the customer's network position within the one or more social network profiles;
    determining a recommended action for the incoming customer communication, wherein the recommended action is determined from the preference and network position of the customer, wherein the recommended action is selected based on a value the recommended action provides; and
    routing the incoming customer communication and the determined recommended action for the incoming customer communication to a customer service representative.

2. The method of claim 1 further comprising retrieving data from a social network, wherein the data comprises information regarding the customer's financial behavior.

3. The method of claim 1, wherein the value of the recommended action further comprises a network value for the customer, wherein the network value is based on the data from the social network.

4. The method of claim 3, wherein the network value is built based on the customer's position within the social network and the connections the customer has within the social network.

5. The method of claim 1, wherein the recommended action is a promotional offer based on the customer communication.

6. The method of claim 1, wherein the recommended action is a promotional offer based on the data from the social network.

7. The method of claim 1, wherein the recommended action is a response based on the customer communication.

8. The method of claim 1, wherein the indication of the reason for the customer communications is provided to the customer representative via an interface.

9. The method of claim 1, wherein the indication of the recommended action is provided to the customer representative via an interface.

10. The method of claim 1, wherein the customer representative is an individual.

11. The method of claim 1, wherein the customer representative is an automated voice system.

12. A system for providing responses to customer communications made to a call center, said system comprising:
    a memory device;
    a communication device; and
    a processing device communicably coupled to the communication device and the memory device, wherein the processing device is configured to:
    receive an incoming customer communication, the incoming customer communication prompted by a question relating to a product or service;
    determine one or more social network profiles associated with a customer of the incoming customer communication;
    retrieve data from the determined one or more social network profiles, wherein the data comprises at least in part information relating to the customer, customer connections within a social network associated with the social network profile, and customer connections to the product or service;
    determine a preference of the customer based at least in part on the incoming customer communication and the data from the one or more social network profiles associated with the customer, wherein the preference comprises a customer interest associated with the product or service;
    determine one or more of the customer's network position within the one or more social network profiles;
    determine a recommended action for the incoming customer communication, wherein the recommended action is determined from the preference and network position of the customer, wherein the recommended action is selected based on a value the recommended action provides; and
    route the incoming customer communication and the determined recommended action for the incoming customer communication to a customer service representative.

13. The system of claim 12, wherein the processing device is further configured to execute computer-readable program code to retrieve data from a social network, wherein the data comprises information regarding the customer's financial behavior.

14. The system of claim 12, wherein the value of the recommended account further comprises a network value for the customer, wherein the network value is based on the data from the social network.

15. The system of claim 14, wherein the network value is built based on the customer's position within the social network and the connections the customer has within the social network.

16. The system of claim 12, wherein the recommended action is a promotional offer based on the customer communication.

17. The system of claim 12, wherein the recommended action is a promotional offer based on the data from the social network.

18. The system of claim 12, wherein the recommended action is a response based on the customer communication.

19. The system of claim 12, wherein the indication of the reason for the customer communications is provided to the customer representative via an interface.

20. The system of claim 12, wherein the indication of the recommended action is provided to the customer representative via an interface.

21. The system of claim 12, wherein the customer representative is an individual.

22. The system of claim 12, wherein the customer representative is an automated voice system.

23. A computer program product comprising at least one non-transitory computer-readable medium having computer-readable program code portions embodied therein, the computer readable program code portions comprising:
   an executable portion configured for receiving an incoming customer communication, the incoming customer communication prompted by a question relating to a product or service;
   an executable portion configured for determining one or more social network profiles associated with a customer of the incoming customer communication;
   an executable portion configured for retrieving data from the determined one or more social network profiles, wherein the data comprises at least in part information relating to the customer, customer connections within a social network associated with the social network profile, and customer connections to the product or service;
   an executable portion configured for determining a preference of the customer based at least in part on the incoming customer communication and the data from the one or more social network profiles associated with the customer, wherein the preference comprises a customer interest associated with the product or service;
   an executable portion configured for determining one or more of the customer's network position within the one or more social network profiles;
   an executable portion configured for determining a recommended action for the incoming customer communication, wherein the recommended action is determined from the preference and network position of the customer, wherein the recommended action is selected based on a value the recommended action provides; and
   an executable portion configured for routing the incoming customer communication and the determined recommended action for the incoming customer communication to a customer service representative.

24. The computer program product of claim 23 further comprising an executable portion configured for retrieving data from a social network, wherein the data comprises information regarding the customer's financial behavior.

25. The computer program product of claim 23, wherein the value of the recommended action further comprises a network value for the customer, wherein the network value is based on the data from the social network.

26. The computer program product of claim 25, wherein the network value is built based on the customer's position within the social network and the connections the customer has within the social network.

27. The computer program product of claim 23, wherein the recommended action is a promotional offer based on the customer communication.

28. The computer program product of claim 23, wherein the recommended action is a promotional offer based on the data from the social network.

29. The computer program product of claim 23, wherein the recommended action is a response based on the customer communication.

30. The computer program product of claim 23, wherein the indication of the reason for the customer communications is provided to the customer representative via an interface.

31. The computer program product of claim 23, wherein the indication of the recommended action is provided to the customer representative via an interface.

32. The computer program product of claim 23, wherein the customer representative is an individual.

33. The computer program product of claim 23, wherein the customer representative is an automated voice system.

34. The method of claim 1, wherein the value of the recommended action is based on an analysis of the one or more social network profiles associated with the customer, wherein the value predicts current and potential for beneficial results from the recommended action.

35. The system of claim 12, wherein the value of the recommended action is based on an analysis of the one or more social network profiles associated with the customer, wherein the value predicts current and potential for beneficial results from the recommended action.

36. The computer program product of claim 23, wherein the value of the recommended action is based on an analysis of the one or more social network profiles associated with the customer, wherein the value predicts current and potential for beneficial results from the recommended action.

* * * * *